United States Patent [19]
Schnyder et al.

[11] Patent Number: 4,583,273
[45] Date of Patent: Apr. 22, 1986

[54] CONTROLLED DEFLECTION ROLL
[75] Inventors: Eugen Schnyder, Ottenbach; Heinz Güttinger, Schaffhausen, both of Switzerland
[73] Assignee: Sulzer-Escher Wyss Ltd., Zürich, Switzerland
[21] Appl. No.: 645,180
[22] Filed: Aug. 29, 1984
[30] Foreign Application Priority Data
Sep. 28, 1983 [CH] Switzerland .................. 5244/83
[51] Int. Cl.$^4$ .............................................. B21B 31/32
[52] U.S. Cl. ......................... 29/113 AD; 29/116 AD; 29/117
[58] Field of Search ......... 29/113 R, 113 AD, 116 R, 29/116 AD, 117, 129

[56] References Cited
U.S. PATENT DOCUMENTS
3,516,135  4/1968  Gallant et al. ................... 28/116 R
3,747,181  7/1973  Nykopp et al. ................. 29/113 AD FOREIGN PATENT DOCUMENTS
1155750 10/1963 Fed. Rep. of Germany .

Primary Examiner—Howard N. Goldberg
Assistant Examiner—Timothy V. Eley
Attorney, Agent, or Firm—Werner W. Kleeman

[57] ABSTRACT

The controlled deflection roll comprises a stationary, non-rotating roll support member and a roll shell mounted to rotate about the stationary roll support member. The roll shell is not directly supported at the stationary roll support member by means of hydraulic support elements, but through the intermediary of additionally provided traveling rings each of which defines a travel path for the related hydraulic support element. The traveling rings have an outer diameter slightly smaller than the inner diameter of the roll shell and they are arranged to be rotatable independently of the roll shell. During operation of the controlled deflection roll the traveling rings, therefore, roll along the inner surface of the roll shell. As a result, the flexibility of the roll shell is improved in circumferential direction as well as transversely to the pressing line of the controlled deflection roller. In this arrangement stiffness of the roll shell in circumferential direction is insured by the traveling rings. Undue deformations of the roll shell are thereby prevented and the force requirements are reduced.

17 Claims, 9 Drawing Figures

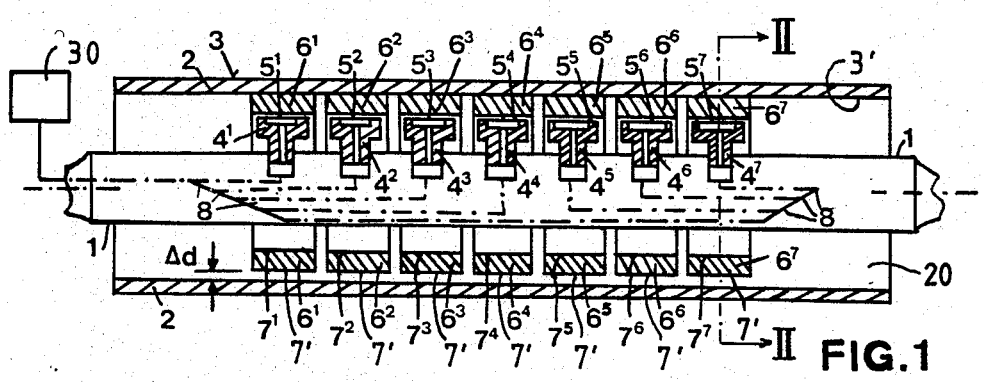
FIG.1
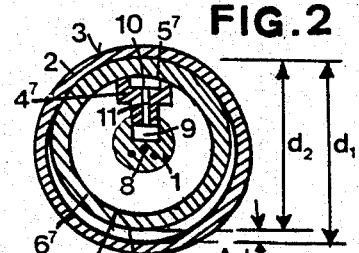
FIG.2
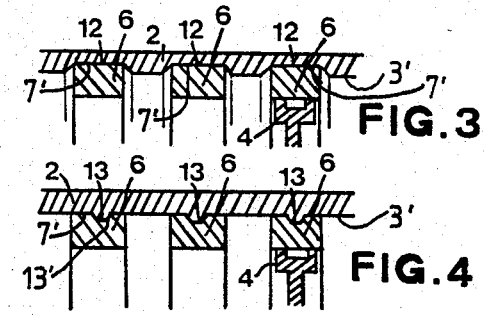
FIG.3
FIG.4
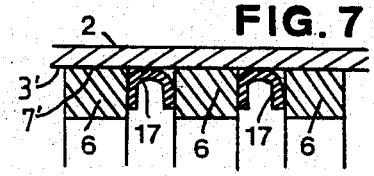
FIG.7
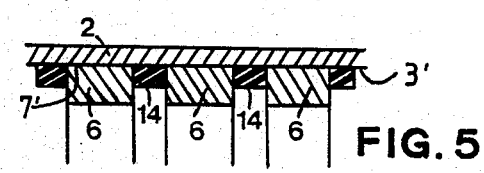
FIG.5
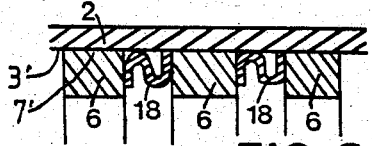
FIG.8
FIG.6
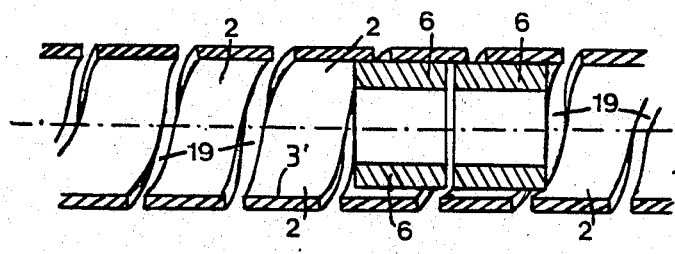
FIG.9

CONTROLLED DEFLECTION ROLL

BACKGROUND OF THE INVENTION

The present invention relates to a new and improved construction of a controlled deflection roll.

In its more particular aspects, the present invention relates to a new and improved construction of controlled deflection roll comprising a stationary or non-rotating roll support member or beam and a roll shell which is rotatable about the stationary roll support member and which is supported at the stationary roll support member by means of hydraulic support or pressure elements. The roll shell defines an outer roll shell surface and there is provided in the interior space of the roll shell a predetermined number of traveling rings each of which is associated with a related one of the support elements. The inner traveling ring surface of each one of the traveling rings provides a travel path for the related support element.

Controlled deflection rollers of the classical type as described, for example, in U.S. Pat. No. 3,885,283, granted May 27, 1975, and U.S. Pat. No. 3,802,044, granted Apr. 9, 1974, are used to roll band-shaped materials, for example, metal bands, like aluminum foils or steel sheet material, paper webs or similar materials.

In the arrangement as described, for example, in U.S. Pat. No. 3,921,514, granted Nov. 25, 1975, the controlled deflection roll cooperates with a counter roll and the contact or pressing force by means of which the two rollers are pressed against each other along a pressure or pressing line is generated by the pressure of a pressure fluid supplied to hydrostatic support elements. The use of controlled deflection rolls in such arrangement affords the advantage that the outer surface thereof adapts itself to the shape of the counter roll along the pressure or pressing line and follows any deformation of the counter roll. Furthermore, the contact or pressing force acting along the pressure or pressing line can be individually controlled and regulated by suitably adjusting the pressure of the pressure fluid effective at the individual hydrostatic support elements in accordance with a desired contact or pressing force profile along the pressure or pressing line, i.e. in axial direction of the rolls.

In order to ensure a desired surface quality of the rolled material, for example, of aluminum foils, steel bands or paper webs, the controlled deflection roll must be provided with a solid and sufficiently smooth outer surface. Preferably, therefore, roll shells made of a suitable type of steel are used in such controlled deflection rolls. Additionally, and in order to achieve the desired effect, the roll shell must have sufficient flexibility in lengthwise as well as in circumferential direction and the material as well as the wall thickness of the roll shell of the controlled deflection roll must be correspondingly selected. As a matter of fact, a small wall thickness would be advantageous with respect to a good transverse flexibility, i.e. a deformability of the roll shell transversely to the pressure or pressing line or to the axis thereof. However, due to the partially significant forces exerted by the support elements, the deformation of the roll shell in circumferential direction would become so large that the yield strength or elastic limit of the material can be reached. Therefore, the wall thickness of the roll shell may not fall short of a predetermined value in order to preclude any undue deformations.

In the known controlled deflection rolls in which the support elements directly act upon the inner surface of the roll shell it is, therefore, impossible to achieve optimum flexibility of the roll shell transversely to the pressure or pressing line as well as in circumferential direction and a compromise must be made with respect to the wall thickness of the roll shell. The roll shell thus can not be selected with any desired thinness in consideration of maintaining sufficient circumferential stability. Consequently, a variation in the contact or pressing force at the location of one support element becomes effective at the adjacent support elements due to the inherently prevailing longitudinal stiffness of the roll shell. A predetermined desired contact or pressing force profile, therefore, can not be adjusted and regulated sufficiently precisely for many kinds of applications at the necessarily required high wall thicknesses and the line force can not be varied sufficiently precisely at the desired locations. There are further required, for the deformation of a roll shell having great wall thickness, a considerable force and a correspondingly greater amount of input power.

A controlled deflection roll as known, for example, from U.S. Pat. No. 4,058,877, granted Nov. 22, 1977, and from German Pat. No. 1,155,750, granted Oct. 17, 1963, comprises a thin elastic roll shell at the inner surface of which traveling rings are provided which are fixedly connected to the roll shell and synchronously rotate conjointly with the roll shell. The traveling rings form travel paths for related hydrostatic support elements or anti-friction or roller bearings hydrostatically pressed thereagainst.

The use of such features in rolls having a hard surface as required, for example, for the rolling of metal foils, i.e. providing traveling rings which are fixedly connected to and rotate conjointly with the roll shell, however, would not eliminate the prior art disadvantages mentioned hereinbefore because the deformation in circumferential direction would remain unchanged, and thus, also the danger of undesirably reaching the yield strength or elastic limit as well as the need for a greater force.

SUMMARY OF THE INVENTION

Therefore, with the foregoing in mind, it is a primary object of the present invention to provide a new and improved controlled deflection roll which is not afflicted with the aforementioned drawbacks and limitations of the prior art constructions heretofore discussed.

Another and more specific object of the present invention is directed to the provision of a new and improved controlled deflection roll having a hard outer surface and an improved flexibility in lengthwise as well as in circumferential direction.

Still a further significant object of the present invention is directed to a new and improved construction of a controlled deflection roll which despite its improved flexibility in lengthwise and in circumferential direction permits the generation of a higher contact or pressing force without the occurrence of undue deformations and yet requires smaller force and power.

Another, still important object of the present invention is directed to a new and improved construction of a controlled deflection roll in which the adjustment of the line force for the individual support or pressure elements is improved and in which the force exerted by the individual support or pressure elements becomes less effective at the adjacent support or pressure elements.

Now in order to implement these and still further objects of the invention, which will become more readily apparent as the description proceeds, the controlled deflection roll of the present development is manifested by the features that, the traveling rings are structured such that their outer diameter is somewhat smaller than the inner diameter of the roll shell and that the traveling rings are loosely placed into the interior space or inner region of the roll shell so as to be rotatable independently thereof.

The subdivision of the travel path for the support elements into a predetermined number of traveling rings or ring members which are rotatable independently of each other and of the roll shell causes an improved transverse flexibility of the inventive controlled deflection roll. Since the outer diameter of the traveling rings is somewhat smaller than the inner diameter of the roll shell, the traveling rings which are loosely placed into the interior space of the roll shell roll along the inner surface of the roll shell.

The main portion of the deformation under the action of the force generated by the support elements is absorbed in this arrangement by the traveling rings and the wall thickness of the actual roll shell can be selected so small that a sufficiently good transverse flexibility as well as circumferential flexibility of the roll shell are achieved.

BRIEF DESCRIPTION OF THE DRAWINGS

The invention will be better understood and objects other than those set forth above, will become apparent when consideration is given to the following detailed description thereof. Such description makes reference to the annexed drawings wherein throughout the various figures of the drawings there have been generally used the same reference characters to denote the same or analogous components and wherein:

FIG. 1 shows a longitudinal section through a first embodiment of the controlled deflection roll according to the invention;

FIG. 2 is a cross-section through the controlled deflection roll shown in FIG. 1 taken substantially along the line II—II in FIG. 1;

FIG. 3 shows a section of the roll shell and of some of the traveling rings in a second embodiment of the controlled deflection roll according to the invention;

FIG. 4 shows a section of the roll shell and of some of the traveling rings in a third embodiment of the controlled deflection roll according to the invention;

FIG. 5 shows a section of the roll shell and of some of the traveling rings in a fourth embodiment of the controlled deflection roll according to the invention;

FIG. 6 is a section of the roll shell and of some of the traveling rings in a fifth embodiment of the controlled deflection roll according to the invention;

FIG. 7 is a section of the roll shell and of some of the traveling rings in a sixth embodiment of the controlled deflection roll according to the invention;

FIG. 8 is a section of the roll shell and of some of the traveling rings in a seventh embodiment of the controlled deflection roll according to the invention; and FIG. 9 is a section through part of the roll shell and part of the traveling rings in an eighth embodiment of the controlled deflection roll according to the invention.

DETAILED DESCRIPTION OF THE PREFERRED EMBODIMENTS

Describing now the drawings, it is to be understood that only enough of the construction of the controlled deflection roll has been shown as needed for those skilled in the art to readily understand the underlying principles and concepts of the present development, while simplifying the showing of the drawings. Turning attention now specifically tO FIG. 1, there has been illustrated in section a first embodiment of the inventive controlled deflection roll comprising a stationary or non-rotating roll support member or beam 1 which is fixed in an appropriate manner at a conventional roll stand which is not particularly illustrated. A roll shell 2 is mounted for rotation about the roll support member or beam 1 and comprises a solid and hard outer roll shell surface 3, an inner roll shell surface 3' and an interior space or inner region 20. The roll shell 2 can be made of a suitable metal, for example, an alloyed and/or hardened steel. The roll shell 2 is supported at the stationary roll support member or beam 1 by a predetermined number of hydrostatic support or pressure elements $4^1 \ldots 4^7$ which are arranged in a row one beside the other in axial direction of the controlled deflection roll. The hydrostatic support elements $4^1 \ldots 4^7$, for example, may be structured like the support elements described in the initially mentioned U.S. Pat. No. 3,802,044, to which reference may be had and the disclosure of which is incorporated herein by reference, or may be structured in any other known and appropriate manner.

The hydrostatic support elements $4^1 \ldots 4^7$ are provided with related bearing surfaces $5^1 \ldots 5^7$ on their side which faces the roll shell 2. Contrary to the known controlled deflection rolls discussed hereinbefore, the hydrostatic support elements $4^1 \ldots 4^7$ do not directly cooperate or interact with the inner roll shell surface 3' of the roll shell 2. In the inventive arrangement traveling rings or ring members $6^1 \ldots 6^7$ are provided in the interior space 20 of the roll shell 2 and each of these traveling rings $6^1 \ldots 6^7$ contains a related inner traveling ring surface $7^1 \ldots 7^7$. Each of the inner traveling ring surfaces $7^1 \ldots 7^7$ is associated with a related one of the support elements $4^1 \ldots 4^7$ and constitutes a travel path for the related support element. The traveling rings $6^1 \ldots 6^7$ are also made of an appropriate metal, for example, alloyed and/or hardened steel. The traveling rings $6^1 \ldots 6^7$ each have an outer traveling ring diameter $d_2$ which is somewhat smaller that the inner roll shell diameter $d_1$ of the roll shell 2, see FIG. 2. The traveling rings $6^1 \ldots 6^7$ are loosely inserted into the interior space 20 defined by the roll shell 2.

During operation of the controlled deflection roll the hydrostatic support elements $4^1 \ldots 4^7$ are supplied with pressure fluid from a suitable pressure fluid supply 30 via pressure lines 8 and are urged in the direction of the rotating roll shell 2. The traveling rings $6^1 \ldots 6^7$ are pressed against the roll shell 2 by the related support elements $4^1 \ldots 4^7$ and rotate conjointly with the roll shell 2, however, at a slightly different rotational speed in accordance with the difference Δd of the inner roll shell diameter $d_1$ and the outer traveling ring diameter $d_2$. The traveling rings $6^1 \ldots 6^7$ thus roll along the inner roll shell surface 3' of the roll shell 2. Due to the different diameters of the roll shell 2 and the traveling rings $6^1 \ldots 6^7$, firstly only the traveling rings $6^1 \ldots 6^7$ are deformed into a slightly elliptical shape under the action of the forces generated by the related support elements $4^1 \ldots 4^7$. Since the roll shell 2 has a greater radius of curvature than the traveling rings $6^1 \ldots 6^7$, no deformation of the roll shell 2 occurs up to a predetermined force, so that the disadvantages due to a deformation of the roll shell which occurs in the known controlled deflection rolls, are a priori avoided or eliminated. Preferably, the difference $\Delta d$ in the diameters $d_1$ and $d_2$ is selected such that the maximum forces are absorbed as exclusively as possible by the traveling rings $6^1 \ldots 6^7$.

Prior art controlled deflection rolls having a length of about 2 meters and a diameter in the range of 35–40 cm hitherto have required a wall thickness of the roll shell in a range of magnitudes extending between 50 mm and 80 mm. It has been shown that, when traveling rings $6^1 \ldots 6^7$ having a wall thickness of about 50 mm are loosely inserted into the roll shell 2, the controlled deflection rolls can be manufactured with roll shells 2 having a wall thickness in the range of only 10 mm to 15 mm. Due to the wall thickness which is smaller by a factor of 3 to 4, the roll shell 2 has a significantly improved flexibility in lengthwise direction as well as in circumferential direction and a sufficient stiffness in circumferential direction is insured due to the presence of the traveling rings $6^1 \ldots 6^7$. Due to the thinner roll shell 2, the line force can be adjusted with greater precision than hitherto has been possible since the effect of the force exerted by the individual support elements $4^1 \ldots 4^7$ on its neighboring regions is considerably reduced. The number of support elements and thus the number of control or regulation points therefore can be increased as compared with the prior art controlled deflection rolls. Furthermore, the force required for a deflection of the roll along the pressure or pressing line or axis is also distinctly smaller than in the prior art controlled deflection rolls due to the lower wall thickness of the roll shell 2.

FIG. 2 is a cross-section in the plane II—II in FIG. 1 and the same elements are generally conveniently designated by the same reference characters in these two figures of the drawings. The difference $\Delta d$ between the inner roll shell diameter $d_1$ of the roll shell 2 and the outer traveling ring diameter $d_2$ of the traveling ring $6^7$ can be distinctly recognized. In the illustrated embodiment the hydrostatic support element $4^7$ is radially displaceable within a cylindrical bore or chamber 9 in the stationary, non-rotating roll support member or beam 1 and is provided with a bearing surface $5^7$ and a pressure pocket or chamber 10. The pressure pocket or chamber 10 communicates, via a throttling passage or bore 11, with the cylindrical bore or chamber 9 which, in turn, is connected to one of the pressure fluid lines 8.

In the first embodiment illustrated in FIGS. 1 and 2 the traveling rings $6^1 \ldots 6^7$ and the related support elements $4^1 \ldots 4^7$ are arranged in the interior space 20 of the roll shell 2 in a densely or an almost closely packed manner. These traveling rings $6^1 \ldots 6^7$ can be retained in their correct position by, for example, not particularly illustrated spring means arranged at the ends of the roll. In such simple arrangement it is of advantage that the roll shell 2 as well as the traveling rings $6^1 \ldots 6^7$ can be constructed as purely cylindrical tubes which can be easily exchanged at favorable costs.

Instead, the maintenance of a defined position of the traveling rings, now generally designated by reference character 6, during the operation of the controlled deflection roll and during rotation of the roll shell 2 can also be achieved in a different manner by additional measures like, for example, annular guide elements, which is explained hereinafter with reference to FIGS. 3 to 8.

FIG. 3 shows a section of the roll shell 2 of a second embodiment of the inventive controlled deflection roll. The roll shell 2 is provided at its inner surface 3' with annular grooves or flutes 12 along which the traveling rings 6 roll and by means of which these traveling rings 6 are retained in their intended or predetermined position.

FIG. 4 shows a section of the roll shell 2 of a third embodiment of the inventive controlled deflection roll in which annular guide elements are provided at the roll shell 2 and further annular guide elements are provided at the traveling rings 6 in such a manner that the annular guide elements and the further annular guide elements cooperate in the manner of a groove-and-tongue relationship. Specifically, the annular guide elements at the roll shell 2 constitute annular webs 13 provided at the inner surface 3' of the roll shell 2. The further annular guide elements constitute complementary annular grooves 13' which are formed at the outer traveling ring surfaces 7' of the traveling rings 6. The annular webs 13 and the interacting annular grooves 13' cooperate such that there is once again insured the intended or predetermined position of the traveling rings 6.

Instead of this design the position of the traveling rings 6 can also be, however, insured by elastic spacer elements. In the fourth embodiment of the inventive controlled deflection roll illustrated in FIG. 5 the roll shell 2 is of a purely cylindrical structure and spacer rings 14 are provided intermediate the traveling rings 6. The spacer rings 14 may be made of, for example, a rubber-elastic or elastomeric material or an appropriate plastic material.

In the fifth embodiment of the inventive controlled deflection roll which is shown in FIG. 6 and which is similar to the embodiment shown in FIG. 5, the spacer rings 15 are of circular cross-section and engage lateral grooves 16 which are provided at the traveling rings 6.

A sixth embodiment of the inventive controlled deflection roll is illustrated in FIG. 7. As shown, the elastic spacer elements therein constitute metal rings 17 of a slightly resilient or springy nature which is due to their U-profile but which property also can be obtained by providing any other appropriate profile.

In the further modified seventh embodiment of the inventive controlled deflection roll illustrated in FIG. 8, the metallic spacer rings 18 are structured such as to form an S-shaped profile which results in an improved resiliency.

In the embodiments of the inventive controlled deflection roll described hereinbefore the roll shell has been structured as a substantially cylindrical tube. In the eight embodiment of the inventive controlled deflection roll shown in FIG. 9 particularly the transverse flexibility, i.e. the flexibility along the pressure or pressing line, is still further improved by providing a helically-shaped slot 19 in the roll shell 2. Accordingly, the roll shell 2 forms a helically-wound band. Also in this embodiment the stiffness in circumferential direction required during operation of the controlled deflection roll is again insured by traveling rings 6 which are provided in the interior space 20 of the roll shell 2. The helically-shaped slot 19 may be continuously formed throughout the entire length of the roll shell 2 but can also be constituted by individual sections. In most cases the slot 19 in the surface of the roll shell 2 does not interfere with the use of the controlled deflection roll since this slot 19 continuously travels along the entire length of the controlled deflection roll during operation thereof.

It is further noted that, within the scope of the invention, instead of the heretofore described construction of controlled deflection rolls with hydrostatic support or pressure elements also other types of controlled deflection rolls can be used with similar advantages, for example, controlled deflection rolls provided with hydrodynamic support or pressure elements or controlled deflection rolls with pressure chambers which constitute the support elements.

While there are shown and described present preferred embodiments of the invention, it is to be distinctly understood that the invention is not limited thereto, but may be otherwise variously embodied and practiced within the scope of the following claims.
ACCORDINGLY,

What we claim is:

1. A controlled deflection roll comprising:
   a stationary roll support member;
   a roll shell mounted to rotate about said stationary roll support member;
   said roll shell defining an interior space and having an inner roll shell diameter;
   a predetermined number of support elements supporting said roll shell at said stationary roll support member;
   a predetermined number of rotatable traveling rings arranged to said interior space defined by said roll shell;
   each one of said predetermined number of rotatable traveling rings being operatively associated with a related one of said predetermined number of support elements;
   each said rotatable traveling ring defining an outer traveling ring diameter which is smaller than said inner roll shell diameter by a predetermined amount; and
   said rotatable traveling rings being loosely inserted into said interior space defined by said roll shell such that said traveling rings are rotatable about said stationary roll support member independently of said roll shell.

2. The controlled deflection roll as defined in claim 1, wherein:
   each one of said predetermined number of rotatable traveling rings defines a related inner traveling ring surface constituting a travel path for said related support element operatively associated therewith.

3. The controlled deflection roll as defined in claim 1, wherein:
   said roll shell has a predetermined wall thickness; and
   each one of said predetermined number of rotatable traveling rings having a predetermined wall thickness which is greater than said predetermined wall thickness of said roll shell.

4. The controlled deflection roll as defined in claim 1, wherein:
   said predetermined number of rotatable traveling rings is arranged in said interior space defined by said roll shell in densely packed relationship with small intermediate spaces formed between individual ones of said rotatable traveling rings.

5. The controlled deflection roll as defined in claim 1, wherein:
   said predetermined number of rotatable traveling rings is arranged in said interior space defined by said roll shell such that individual ones of said rotatable traveling rings are arranged in spaced relationship from each other.

6. The controlled deflection roll as defined in claim 1, wherein:
   each one of said predetermined number of support elements constitutes a hydraulic support element.

7. The controlled deflection roll as defined in claim 1, further including:
   a pressure-fluid supply;
   a related inner traveling ring surface defined by each one of said predetermined number of rotatable traveling rings; and
   each said related support element constituting a hydrostatic support element comprising a bearing surface in flow communication with said pressure fluid supply and cooperating with said inner traveling ring surface of the operatively associated rotatable traveling ring.

8. A controlled deflection roll comprising:
   a stationary roll support member;
   a roll shell mounted to rotate about said stationary roll support member;
   said roll shell defining an interior space and having an inner roll shell diameter;
   a predetermined number of support elements supporting said roll shell at said stationary roll support member;
   a predetermined number of traveling rings arranged in said interior space defined by said roll shell;
   each one of said predetermined number of traveling rings being operatively associated with a related one of said predetermined number of support elements;
   each said traveling ring defining an outer traveling ring diameter which is smaller than said inner roll shell diameter by a predetermined amount;
   said traveling rings being loosely inserted into said interior space defined by said roll shell such that said traveling rings are rotatable independently of said roll shell;
   a predetermined number of annular guide elements; and
   each said guide element being operatively associated with a related one of said traveling rings in order to retain the same in a related predetermined position.

9. The controlled deflection roll as defined in claim 8, wherein:
   said roll shell defines an inner roll shell surface; and
   said predetermined number of annular guide elements being disposed at said inner roll shell surface defined by said roll shell.

10. The controlled deflection roll as defined in claim 8, wherein:
    each one of said predetermined number of traveling rings defines an outer traveling ring surface; and
    a related one of said predetermined number of annular guide elements being disposed at said outer traveling ring surface.

11. A controlled deflection roll comprising:
    a stationary roll support member;
    a roll shell mounted to rotate about said stationary roll support member;
    said roll shell defining a interior space and having an inner roll shell diameter;
    a predetermined number of support elements supporting said roll shell at said stationary roll support member;

a predetermined number of traveling rings arranged in said interior space defined by said roll shell;

each one of said predetermined number of traveling rings being operatively associated with a related one of said predetermined number of support elements;

each said traveling ring defining an outer traveling ring diameter which is smaller than said inner roll shell diameter by a predetermined amount;

said traveling rings being loosely inserted into said interior space defined by said roll shell such that said traveling rings are rotatable independently of said roll shell;

an inner roll shell surface defined at said roll shell;

a predetermined number of annular guide elements being disposed at said inner roll shell surface of said roll shell;

each one of said predetermined number of traveling rings defining an outer traveling ring surface;

each one of a predetermined number of further annular guide elements being disposed at said outer traveling ring surface of a related one of said predetermined number of traveling rings; and said predetermined number of annular guide elements and said predetermined number of further annular guide elements cooperating such that each one of said traveling rings is retained in a related predetermined position.

12. The controlled deflection roll as defined in claim 11, wherein:

each one of said predetermined number of annular guide elements cooperates with a related one of said predetermined number of further annular guide elements in a groove-and-tongue relationship.

13. A controlled deflection roll comprising:

a stationary roll support member;

a roll shell mounted to rotate about said stationary roll support member;

said roll shell defining an interior space and having an inner roll shell diameter;

a predetermined number of support elements supporting said roll shell at said stationary roll support member;

a predetermined number of traveling rings arranged in said interior space defined by said roll shell;

each one of said predetermined number of traveling rings being operatively associated with a related one of said predetermined number of support elements;

each said traveling ring defining an outer traveling ring diameter which is smaller than said inner roll shell diameter by a predetermined amount;

said traveling rings being loosely inserted into said interior space defined by said roll sheel such that said traveling rings are rotatable independently of said roll shell;

said predetermined number of traveling rings being arranged in said interior space defined by said roll shell such that individual ones of said traveling rings are arranged in spaced relationship from each other;

a predetermined number of spacer elements provided intermediate said traveling rings; and said spacer elements being operatively associated with said traveling rings in order to retain the same in a predetermined position.

14. The controlled deflection roll as defined in claim 13, wherein:

said spacer elements constitute elastic spacer elements.

15. The controlled deflection roll as defined in claim 14, wherein:

said elastic spacer elements constitute rubber-elastic spacer elements.

16. The controlled deflection roll as defined in claim 14, wherein:

said elastic spacer elements constitute metallic elements bent in such a manner as to form a spring profile.

17. A controlled deflection roll comprising:

a stationary roll support member;

a roll shell mounted to rotate about said stationary roll support member;

said roll shell defining an interior space and having an inner roll shell diameter;

a predetermined number of support elements supporting said roll shell at said stationary roll support member;

a predetermined number of traveling rings arranged in said interior space defined by said roll shell;

each one of said predetermined number of traveling rings being operatively associated with a related one of said predetermined number of support elements;

each said traveling ring defining an outer traveling ring diameter which is smaller than said inner roll shell diameter by a predetermined amount;

said traveling rings being loosely inserted into said interior space defined by said roll shell such that said traveling rings are rotatable independently of said roll shell; and a helically-extending slot provided in said roll shell.

* * * * *